US009194498B2

(12) United States Patent
Yoshino et al.

(10) Patent No.: US 9,194,498 B2
(45) Date of Patent: Nov. 24, 2015

(54) SEALING DEVICE

(71) Applicant: EAGLE INDUSTRY CO., LTD., Tokyo (JP)

(72) Inventors: Akira Yoshino, Tokyo (JP); Koichiro Oiyama, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/422,208

(22) PCT Filed: Jun. 18, 2013

(86) PCT No.: PCT/JP2013/066714
§ 371 (c)(1),
(2) Date: Feb. 18, 2015

(87) PCT Pub. No.: WO2014/030413
PCT Pub. Date: Feb. 27, 2014

(65) Prior Publication Data
US 2015/0226330 A1    Aug. 13, 2015

(30) Foreign Application Priority Data
Aug. 23, 2012  (JP) ................................. 2012-184388

(51) Int. Cl.
*F16J 15/02* (2006.01)
*F16J 15/32* (2006.01)
*F16J 15/00* (2006.01)

(52) U.S. Cl.
CPC ............ *F16J 15/3232* (2013.01); *F16J 15/002* (2013.01); *F16J 15/32* (2013.01); *F16J 15/322* (2013.01); *F16J 15/3268* (2013.01)

(58) Field of Classification Search
CPC ...... F16J 15/32; F16J 15/3204; F16J 15/3232; F16J 15/3248; F16J 15/3252; F16J 15/3268
See application file for complete search history.

(56) References Cited

U.S. PATENT DOCUMENTS

| 6,264,205 | B1 | 7/2001 | Balsells | |
|---|---|---|---|---|
| 8,256,772 | B2* | 9/2012 | Itadani et al. | 277/353 |
| 8,579,297 | B2* | 11/2013 | Arita | 277/551 |
| 2011/0215536 | A1 | 9/2011 | Itadani et al. | |
| 2012/0169015 | A1* | 7/2012 | Oiyama et al. | 277/562 |
| 2013/0154200 | A1 | 6/2013 | Arita | |

FOREIGN PATENT DOCUMENTS

| JP | 01-077169 | 5/1989 |
|---|---|---|
| JP | 06-014630 | 2/1994 |
| JP | 03269615 A | 9/2003 |
| WO | 2010061670 A1 | 6/2010 |
| WO | 2012032678 A1 | 3/2012 |
| WO | WO 2012032678 A1 * | 3/2012 |

* cited by examiner

*Primary Examiner* — Gilbert Lee
(74) *Attorney, Agent, or Firm* — Harness, Dickey & Pierce, P.L.C.

(57) ABSTRACT

A sealing device for sealing an annular gap between a housing having a shaft inserted into a shaft hole for preventing leaking of a fluid on one side in an axial direction to another side in the axial direction that is capable of stabilizing the posture of the sealing lip of the first sealing member made of rubber-like elastomer and exhibiting a good sealing performance. The sealing device includes a first sealing member (120) made of rubber-like elastomer, a second sealing member (140) made of resin, and an adaptor (160) that positions the first sealing member (120) in the axial direction, and a bent portion (163) in which an edge portion (165) is bent toward an outer peripheral side so as to be spaced apart from an outer peripheral surface of a sealing lip (123).

1 Claim, 5 Drawing Sheets

SEALING DEVICE

CROSS-REFERENCE TO RELATED APPLICATIONS

This application is a National Stage of International Application No. PCT/2013/066714, filed Jun. 18, 2013, which claims priority to Japanese Application No. 2012-184388, filed Aug. 23, 2012. The entire disclosures of the above applications are incorporated herein by reference.

FIELD

The present disclosure relates to a sealing device for sealing an annular gap between a shaft and a shaft hole of a housing.

BACKGROUND

Conventionally, there is known a sealing device (lip type seal) that includes a first sealing member made of rubber-like elastomer and a second sealing member made of resin, and seals an annular gap between a housing having a shaft hole and a shaft inserted into the shaft hole for preventing leaking of a sealed fluid to an air side (see Patent Literature 1).

Hereinafter, a sealing device according to the conventional art will be described with reference to FIG. 5. FIG. 5 is a schematic cross-sectional view intersected by a plane passing through the center of a rotating shaft 21 showing an attachment state of a sealing device 200 according to the conventional art (showing only an intersected end face).

The sealing device 200 is attached to an inner peripheral surface of a shaft hole 31 of a housing 30, and seals an annular gap between the inner peripheral surface of the shaft hole 31 and the rotating shaft 21 inserted into the shaft hole 31. The sealing device 200 includes a case (cartridge) 210 made of metal that is fitted in the inner peripheral surface of the shaft hole 31 and retains sealing members and the like. Individual constituent parts are fixed to each other non-adhesively and are thereby constructed as one unit (constructed as a cartridge). The sealing device 200 includes an adaptor 260 that is fitted in an inner peripheral surface of the case 210 and abuts on a first sealing member 220 from a sealed fluid side (L). By abutting on the first sealing member 220 in this manner, the adaptor 260 positions the first sealing member 220 in an axial direction and prevents the first sealing member 220 from being detached toward the sealed fluid side (L).

However, in this conventional art, a sealing lip 223 of the first sealing member 220 is not sufficiently positioned, and hence it has been difficult to prevent the sealing lip 223 from being vibrated or turned outward so that a stable sealing performance can be exhibited.

CITATION LIST

Patent Literature

[Patent Literature 1] WO 2010/061670

SUMMARY

Technical Problem

An object of the present disclosure is to provide a sealing device that is capable of stabilizing the posture of the sealing lip of the first sealing member made of rubber-like elastomer and exhibiting a good sealing performance.

Solution to Problem

The present disclosure has adopted the following means in order to solve the above problem.

That is, the sealing device of the present disclosure is a sealing device for sealing an annular gap between a housing having a shaft hole and a shaft inserted into the shaft hole for preventing leaking of a fluid on one side in an axial direction to another side in the axial direction, characterized by comprising: a first sealing member made of a rubber-like elastomer comprising a body and a sealing lip extending toward the one side in the axial direction from the body and being in slidable contact with an outer peripheral surface of the shaft; a second sealing member made of resin being in slidable contact with the outer peripheral surface of the shaft at a position further to the other side in the axial direction from a position where the first sealing member is in contact with the outer peripheral surface of the shaft; a positioning member being in contact with an end face on the one side of the body in the axial direction and including a positioning portion for positioning the first sealing member in the axial direction; and a case retaining the first sealing member, the second sealing member, and the positioning member, wherein the positioning member includes a bent portion on the one side of an inner peripheral end portion of the positioning portion in the axial direction in which an edge portion at a tip thereof is bent toward an outer peripheral side so as to be spaced apart from an outer peripheral surface of the sealing lip and a portion thereof that is positioned further to an inner peripheral side from the tip is in surface contact with the outer peripheral surface of the sealing lip.

According to the sealing device of the present disclosure, because the positioning member includes the bent portion on the one side of the inner peripheral end portion of the positioning portion in the axial direction in which the portion thereof that is positioned further to the inner peripheral side from the tip is in surface contact with the outer peripheral surface of the sealing lip of the first sealing member, it is possible to position the sealing lip from the outer peripheral side. Accordingly, it is possible to stabilize the posture of the sealing lip and make the first sealing member exhibit its sealing performance effectively.

Further, according to the sealing device of the present disclosure, the edge portion at the tip of the bent portion is bent toward the outer peripheral side so as to be spaced apart from the outer peripheral surface of the sealing lip. Thus, when the sealing device is in a state in which it is attached to the housing, even when the sealing lip of the first sealing member is deformed toward the outer peripheral side, the outer peripheral surface of the sealing lip is prevented from coming into contact with the edge portion at the tip of the bent portion. Accordingly, it is possible to effectively suppress occurrence of damage such as a crack or the like to the outer peripheral surface of the sealing lip. Consequently, it is possible to maintain the sealing performance of the first sealing member effectively.

Advantageous Effects of Disclosure

According to the present disclosure, it is possible to provide a sealing device that is capable of stabilizing the posture of the sealing lip of the first sealing member made of rubber-like elastomer and exhibiting a good sealing performance.

DRAWINGS

DETAILED DESCRIPTION

Hereinafter, with reference to the drawings, modes for carrying out the present disclosure will be exemplarily described in detail based on examples thereof. However, the dimensions, materials, shapes, relative arrangements and so on of constituent parts described in the examples are not intended to limit the scope of the present disclosure to these alone in particular unless specifically described.

First Example

Figure 1:
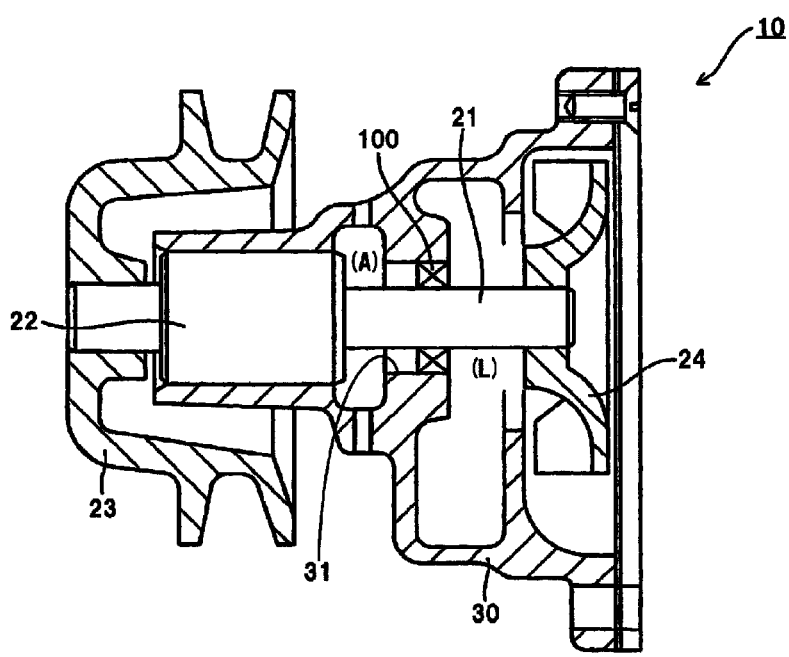
FIG. 1 is a schematic cross-sectional view showing an application example of a sealing device according to an example of the present disclosure.
Figure 2:
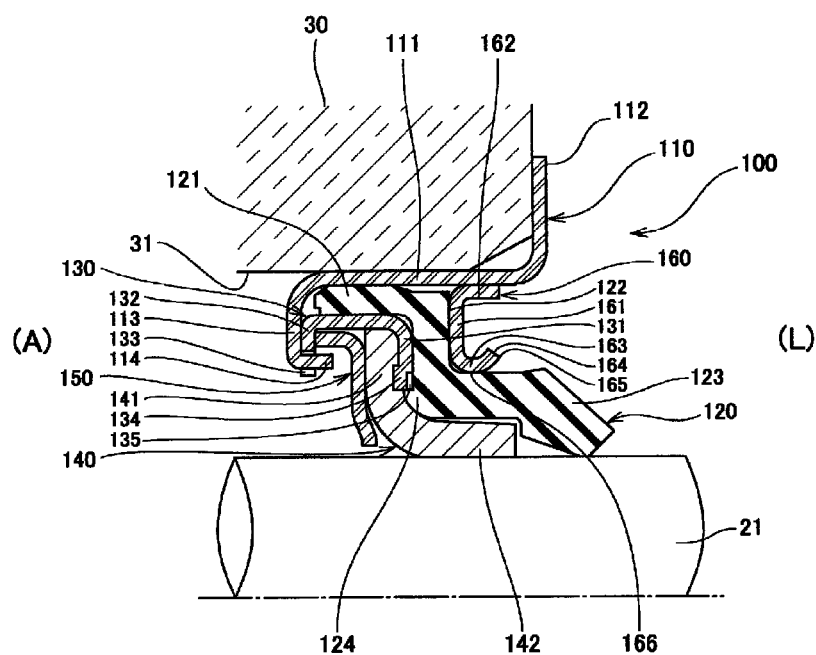
FIG. 2 is a schematic cross-sectional view showing an attachment state of a sealing device according to a first example of the present disclosure.

With reference to FIGS. 1 and 2, a sealing device according to a first example of the present disclosure will be described.

<Application Example of Sealing Device>

With reference to FIG. 1, an application example of a sealing device 100 according to the example of the present disclosure will be described. FIG. 1 is a schematic cross-sectional view of a water pump 10 for an automobile. The water pump 10 includes a rotating shaft 21 and a housing 30 having a shaft hole 31 into which the rotating shaft 21 is inserted. To the rotating shaft 21, a bearing 22 for smoothing the rotation of the rotating shaft 21 is attached. In addition, a pulley 23 to which a rotational driving force is given by a belt (not shown) or the like is attached to one end side of the rotating shaft 21, and an impeller 24 for pressuring and sending cooling water is attached to the other end side thereof. The sealing device 100 according to the present example is disposed in an annular gap between the rotating shaft 21 and the housing 30 in order to prevent leaking of the cooling water to the outside (i.e., an air side (A) opposite to a sealed fluid side (L)). In the present example, a sealed fluid is the cooling water.

<Configuration of Sealing Device>

With reference to FIG. 2, the sealing device according to the first example of the present disclosure will be described. FIG. 2 is a schematic cross-sectional view intersected by a plane passing through the center of the rotating shaft 21 showing an attachment state of the sealing device 100 according to the first example of the present disclosure (showing only an intersected end face).

The sealing device 100 includes a case (cartridge) 110 made of metal, a first sealing member 120 made of rubber-like elastomer, a swaging member 130 made of metal, a second sealing member 140 made of resin, and a backup ring 150 made of metal. In addition, the sealing device 100 includes an adaptor 160 as a positioning member that positions the first sealing member 120 in an axial direction.

The case 110 is configured by an annular member, and is fixed in the shaft hole 31 with the outer peripheral surface of a cylindrical portion 111 being fitted in the inner peripheral surface of the shaft hole 31 of the housing 30. In addition, the case 110 includes an outward flange 112 that is formed on the outer peripheral side (in a radially outward direction) of the end portion on the sealed fluid side (L) of the cylindrical portion 111. When the sealing device 100 is attached to the shaft hole 31, the outward flange 112 abuts against the end face on the sealed fluid side (L) of the housing 30 to thereby define the attachment position in the axial direction (attachment depth). In addition, on the end portion on the air side (A) of the cylindrical portion 111, an inward flange portion 113 that is formed on the inner peripheral side (in a radially inward direction) is provided. On the inner peripheral end portion of the inward flange portion 113, one or a plurality of engaging convex portions 114 that engage with notches 133 provided on a second flange portion 132 of the swaging member 130 described later are provided.

The first sealing member 120 includes a tubular body 121 having an L-shaped cross section, and a first sealing lip 123 that is configured to extend toward the sealed fluid side (L) from the body 121 and further toward the inner peripheral side. Note that the first sealing lip 123 is in slidable contact with the outer peripheral surface of the rotating shaft 21. On the inner peripheral side of the body 121 of the first sealing member 120, the swaging member 130 configured by an annular member is fitted. Accordingly, the cylindrical portion of the body 121 is held between the outer peripheral surface of the swaging member 130 and the inner peripheral surface of the case 110, and the first sealing member 120 is thereby positioned in the radial direction relative to the case 110.

The second sealing member 140 includes a plate-like fixed portion 141, and a second sealing lip 142 that is configured to extend further toward the inner peripheral side and the sealed fluid side (L) from the tip of the fixed portion 141 on the inner peripheral side. Note that the second sealing lip 142 is in slidable contact with the outer peripheral surface of the rotating shaft 21 at a position further to the air side (A) from a position where the first sealing lip 123 is in contact with the outer peripheral surface of the rotating shaft 21. On the air side (A) of the second sealing member 140, the annular backup ring 150 is disposed. The fixed portion 141 of the second sealing member 140 and the backup ring 150 are retained by swaging so as to be held between a first flange portion 131 provided on the inner peripheral side of the sealed fluid side (L) of the swaging member 130 and the second flange portion 132 provided on the inner peripheral side of the air side (A) of the swaging member 130. Note that one or a plurality of the notches 133 that engage with the engaging convex portions 114 provided on the case 110 are provided on the second flange portion 132.

The adaptor 160 abuts on an end face 122 on the sealed fluid side (L) of the body 121 of the first sealing member 120. The adaptor 160 is fitted in the inner peripheral surface of the cylindrical portion 111 of the case 110 and is thereby fixed on the inner peripheral side of the case 110. The adaptor 160 positions the first sealing member 120 in the axial direction relative to the case 110, and also exhibits a function of preventing the first sealing member 120 from being detached toward the sealed fluid side (L).

Next, assembly procedures of the sealing device 100 will be described briefly. Firstly, the fixed portion 141 of the second sealing member 140 and the outer peripheral side portion of the backup ring 150 are placed on the inner peripheral side of the swaging member 130 on which the first flange portion 131 is formed on its end portion on the one side thereof in the axial direction. Then, by forming the second flange portion 132 by bending the end portion on the other side of the swaging member 130 in the axial direction toward the inner peripheral side, the second sealing member 140 and the backup ring 150 are fixed by swaging. Next, with the inner peripheral surface of the body 121 of the first sealing member 120 being in intimate contact with the outer peripheral surface of the swaging member 130, the first sealing member 120 and the swaging member 130 are pushed along the inner peripheral surface of the cylindrical portion 111 in the axial direction so that the cylindrical portion of the body 121 is fitted in the inner peripheral surface of the cylindrical portion 111. At this time, by engaging the notch 133 provided on the second flange portion 132 of the swaging member 130 with the engaging convex portion 114 provided on the inward flange portion 113 of the case 110, the swaging member 130 is positioned in the radial direction relative to the case 110. Then, the adaptor 160 is press-fitted into the inner peripheral side of the cylindrical portion 111, thereby positioning the first sealing member 120 and other members are in the axial direction relative to the case 110.

With the configuration described above, the individual members described above are integrally constructed as a cartridge. That is, the case 110 retains the first sealing member 120, the swaging member 130, the second sealing member 140, the backup ring 150, and the adaptor 160 in the cylindrical portion 111, and hence it becomes possible to handle the sealing device 100 as one component.

Note that a convex portion 134 provided on the face on the air side (A) of the first flange portion 131 of the swaging member 130 is pushed against the second sealing member 140, and hence the swaging member 130 and the second sealing member 140 are prevented from relative rotation. In addition, by forming the convex portion 134, the first sealing member 120 is pushed against a concave portion 135 provided on the face on the sealed fluid side (L) of the first flange portion 131, and hence the swaging member 130 and the first sealing member 120 are prevented from relative rotation. Further, an annular convex portion 124 provided on the inner peripheral side and the air side (A) of the body 121 of the first sealing member 120 abuts on the second sealing member 140, and hence the posture of the second sealing member 140 is stabilized.

Next, the adaptor 160 according to the present example will be described in detail. As shown in FIG. 2, the adaptor 160 includes an annular and planar positioning portion 161 and a cylindrical portion 162 provided on the outer peripheral side of the positioning portion 161. The positioning portion 161 abuts on the end face 122 of the first sealing member 120 when the adaptor 160 is press-fitted into the cylindrical portion 111 of the case 110. Note that the posture of the body 121 is stabilized by causing the positioning portion 161 to abut on the end face 122 with an appropriate pressing force. In addition, the cylindrical portion 162 is a portion which is fitted in the inner peripheral surface of the cylindrical portion 111 of the case 110 when the adaptor 160 is press-fitted into the case 110.

In addition, the adaptor 160 has a bent portion 163 on the sealed fluid side (L) of the inner peripheral end portion of the positioning portion 161 in which an edge portion 165 at a tip 164 is bent toward the outer peripheral side so as to be spaced apart from the outer peripheral surface of the first sealing lip 123 and a contacting portion 166 that is positioned further to the inner peripheral side from the tip 164 is in surface contact with the outer peripheral surface of the first sealing lip 123. By employing such a configuration, when the sealing device 100 is in a state in which it is attached to the housing 30, the edge portion 165 is prevented from coming into contact with the outer peripheral surface of the first sealing lip 123. In addition, because the contacting portion 166 of the bent portion 163 is in surface contact with the outer peripheral surface of the first sealing lip 123, the first sealing lip 123 is being positioned from the outer peripheral side and thus its posture is stabilized. Note that the angle of the bending of the bent portion 163 may be appropriately determined, and the angle thereof may be a gentle angle as shown in FIG. 2, or the bent portion 163 may also be bent by 180 degrees so that the tip 164 faces a radially outward direction.

<Advantages of the Sealing Device According to the Present Example>

According to the sealing device 100 according to the present example, the adaptor 160 has the bent portion 163 provided with the contacting portion 166 that is in surface contact with the outer peripheral surface of the first sealing lip 123 of the first sealing member 120. Thus, it is possible to position the first sealing lip 123 from the outer peripheral side. Accordingly, it is possible to stabilize the posture of the first sealing lip 123 and make the first sealing member 120 exhibit its sealing performance effectively.

In addition, according to the sealing device 100 according to the present example, the edge portion 165 at the tip 164 of the bent portion 163 is bent toward the outer peripheral side so as to be spaced apart from the outer peripheral surface of the first sealing lip 123. Thus, when the sealing device 100 is in a state in which it is attached to the housing 30, even when the first sealing lip 123 is deformed toward the outer peripheral side, the outer peripheral surface of the first sealing lip 123 is prevented from coming into contact with the edge portion 165. Accordingly, it is possible to effectively suppress occurrence of damage such as a crack or the like to the outer peripheral surface of the first sealing lip 123. Consequently, it is possible to maintain the sealing performance of the first sealing member 120 effectively.

Second Example

Figure 3:
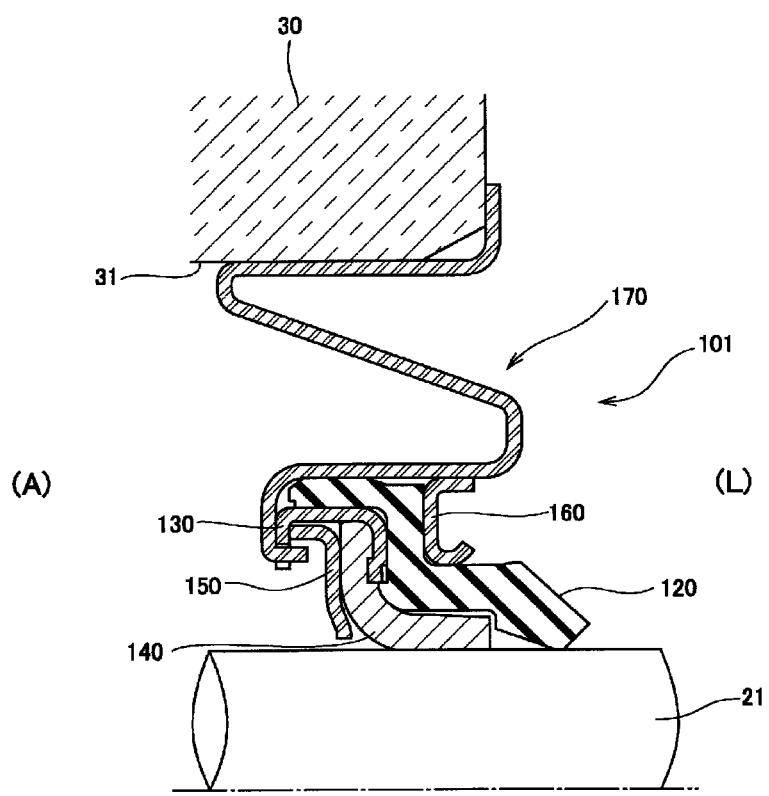
FIG. 3 is a schematic cross-sectional view showing an attachment state of a sealing device according to a second example of the present disclosure.

FIG. 3 shows a second example of the present disclosure (showing only an intersected end face). In the present example, a modification of the case in the first example will be described. The other constituent parts and their operations are the same as those in the first example, thus the same constituent parts are designated by the same reference signs as those in the first example, and the description thereof will be omitted.

There may be a case where the size of the annular gap to be sealed by the sealing device becomes larger depending on the relation between the rotating shaft 21 and the inner diameter of the shaft hole 31 of the housing 30. Therefore, in a sealing device 101 according to the present example, a portion having an S-shaped cross section is provided in a case (cartridge) 170 to provide elasticity in the radial direction, and hence a sufficient sealing performance is exhibited even in the case of a large annular gap without degrading ease of attachment. The constituent parts other than the case 170 are as described in the first example, and hence the description thereof will be omitted.

Third Example

Figure 4:
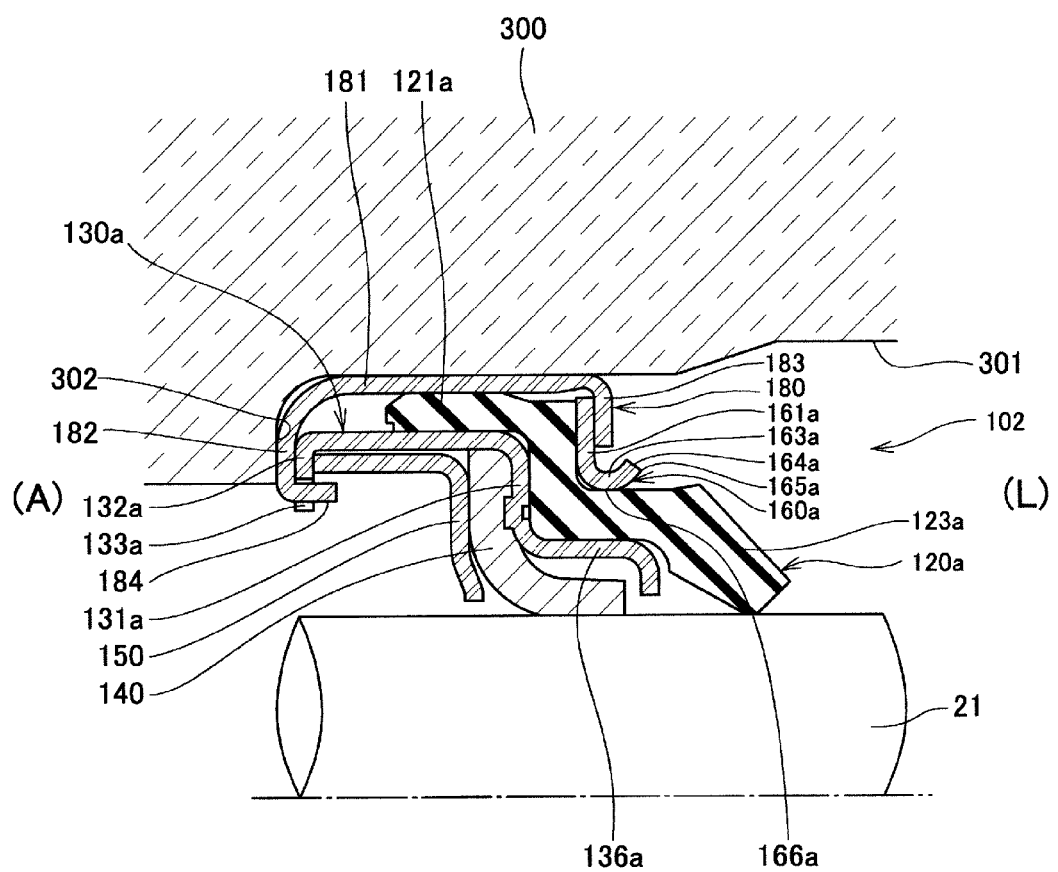
FIG. 4 is a schematic cross-sectional view showing an attachment state of a sealing device according to a third example of the present disclosure.
Figure 5:
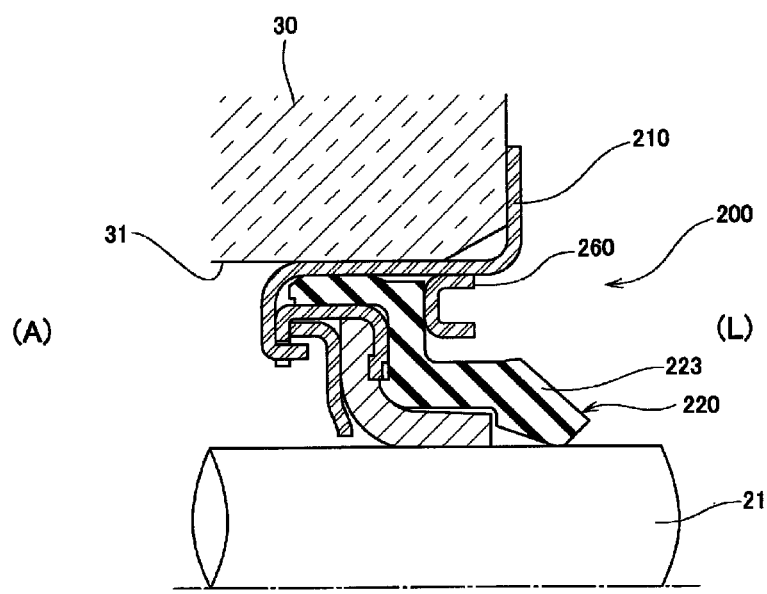
FIG. 5 is a schematic cross-sectional view showing an attachment state of a sealing device according to the conventional art.

FIG. 4 shows a third example of the present disclosure (showing only an intersected end face). In the present example, the case of the sealing device abuts on a stepped surface provided in the shaft hole of the housing. Note that, in the description of the present example, the same constituent parts as those in the first example are designated by the same reference signs as those in the first example and the description thereof will be omitted.

A sealing device 102 that is attached to a shaft hole 301 of a housing 300 includes a case (cartridge) 180 made of metal, a first sealing member 120a made of rubber-like elastomer, a swaging member 130a made of metal, the second sealing member 140 made of resin, and the backup ring 150 made of metal. In addition, the sealing device 102 includes an adaptor 160a as a positioning member that positions the first sealing member 120a in the axial direction.

In the case 180, the outer peripheral surface of a cylindrical portion 181 is fitted in the inner peripheral surface of the shaft hole 301, and an inward flange portion 182 provided on the air side (A) of the cylindrical portion 181 abuts on a stepped surface 302 in the shaft hole 301. In addition, an angled portion 183 provided on the sealed fluid side (L) of the cylindrical portion 181 retains the adaptor 160a by pushing the adaptor 160a from the sealed fluid side (L). One or a plurality of engaging convex portions 184 that engage with notches 133a provided on a second flange portion 132a of the swaging member 130a are provided on the inward flange portion 182.

The first sealing member 120a includes a body 121a and a first sealing lip 123a that is in slidable contact with the outer peripheral surface of the rotating shaft 21. Note that the first sealing member 120a is a member substantially equivalent to the first sealing member 120 except that the first sealing member 120a does not have a constituent part corresponding to the annular convex portion 124 in the first sealing member 120 according to the first example. On the inner peripheral side of the first sealing member 120a, the swaging member 130a configured by an annular member is fitted. The swaging member 130a further includes an extended portion 136a that extends toward the sealed fluid side (L) from a first flange portion 131a along the inner peripheral side of the first sealing lip 123a. The extended portion 136a stabilizes the posture of the first sealing lip 123a by positioning the first sealing lip 123a from the inner peripheral side. Accordingly, the sealing performance of the first sealing member 120a is exhibited effectively. Note that the swaging member 130a is a member substantially equivalent to the swaging member 130 according to the first example except that the swaging member 130a has the extended portion 136a. That is, the second sealing member 140 and the backup ring 150 are retained by swaging by the first flange portion 131a and the second flange portion 132a. In addition, a convex portion provided on the surface on the air side (A) of the first flange portion 131a prevents rotation relative to the second sealing member 140, and a concave portion provided on the surface on the sealed fluid side (L) prevents rotation relative to the first sealing member 120a.

In addition, the adaptor 160a retained by the angled portion 183 of the case 180 has a bent portion 163a on the sealed fluid side (L) of the inner peripheral end portion of a positioning portion 161a. The bent portion 163a is a member substantially equivalent to the bent portion 163 according to the first example. An edge portion 165a at a tip 164a is bent toward the outer peripheral side so as to be spaced apart from the outer peripheral surface of the first sealing lip 123a and a contacting portion 166a that is positioned further to the inner peripheral side from the tip 164a is in surface contact with the outer peripheral surface of the first sealing lip 123a.

In the sealing device 102 according to the present example, effects equivalent to those of the sealing device 100 according to the first example are achieved as well. That is, because the adaptor 160a has the bent portion 163a provided with the contacting portion 166a that is in surface contact with the outer peripheral surface of the first sealing lip 123a, it is possible to position the first sealing lip 123a from the outer peripheral side. Accordingly, it is possible to stabilize the posture of the first sealing lip 123a and make the first sealing member 120a exhibit its sealing performance effectively. In addition, the edge portion 165a at the tip 164a of the bent portion 163a is bent toward the outer peripheral side so as to be spaced apart from the outer peripheral surface of the first sealing lip 123a. Thus, when the sealing device 102 is in a state in which it is attached to the housing 300, even when the first sealing lip 123a is deformed toward the outer peripheral side, the outer peripheral surface of the first sealing lip 123a is prevented from coming into contact with the edge portion 165a. Accordingly, it is possible to effectively suppress occurrence of damage such as a crack or the like to the outer peripheral surface of the first sealing lip 123a. Consequently, it is possible to maintain the sealing performance of the first sealing member 120a effectively.

OTHERS

In the examples described above, although the descriptions have been given by referring to the case where the sealing device is used in the water pump 10 for an automobile as the application example of the sealing device, the present disclosure can be applied to various devices in which an annular gap between a shaft and a housing rotating relative to each other needs to be sealed. In particular, the present disclosure can be suitably used as a sealing device or sealing structure for a shaft seal in a device for home electronics or an industrial water pump having a low load.

REFERENCE SIGNS LIST

10: water pump
21: rotating shaft
30, 300: housing
100, 101, 102: sealing device
110, 170, 180: case
120, 120a: first sealing member
130, 130a: swaging member
140: second sealing member
150: backup ring
160, 160a: adaptor
165, 165a: edge portion

The invention claimed is:
1. A sealing device for sealing an annular gap between a housing having a shaft hole and a shaft inserted into the shaft hole for preventing leaking of a fluid on one side in an axial direction to another side in the axial direction, the sealing device comprising:
a first sealing member made of a rubber-like elastomer comprising a body and a sealing lip, the sealing lip extending toward the one side in the axial direction from the body and being in slidable contact with an outer peripheral surface of the shaft;
a second sealing member made of resin being in slidable contact with the outer peripheral surface of the shaft at a position further to the other side in the axial direction from a position where the first sealing member is in contact with the outer peripheral surface of the shaft;
a positioning member being in contact with an end face on the one side of the body in the axial direction and including a positioning portion for positioning the first sealing member in the axial direction; and a case retaining the first sealing member, the second sealing member, and the positioning member, wherein the positioning member includes a bent portion on the one side of an inner peripheral end portion of the positioning portion in the axial direction, an edge portion at a tip of the bent portion being bent toward an outer peripheral side so as to be spaced apart from an outer peripheral surface of the sealing lip, a contacting portion of the bent portion positioned further to an inner peripheral side from the tip being in surface contact with the outer peripheral surface of the sealing lip.

\* \* \* \* \*